April 19, 1949.  H. S. JANDUS  2,467,557
BRAKE LEVER STRUCTURE
Filed May 20, 1946  2 Sheets-Sheet 1
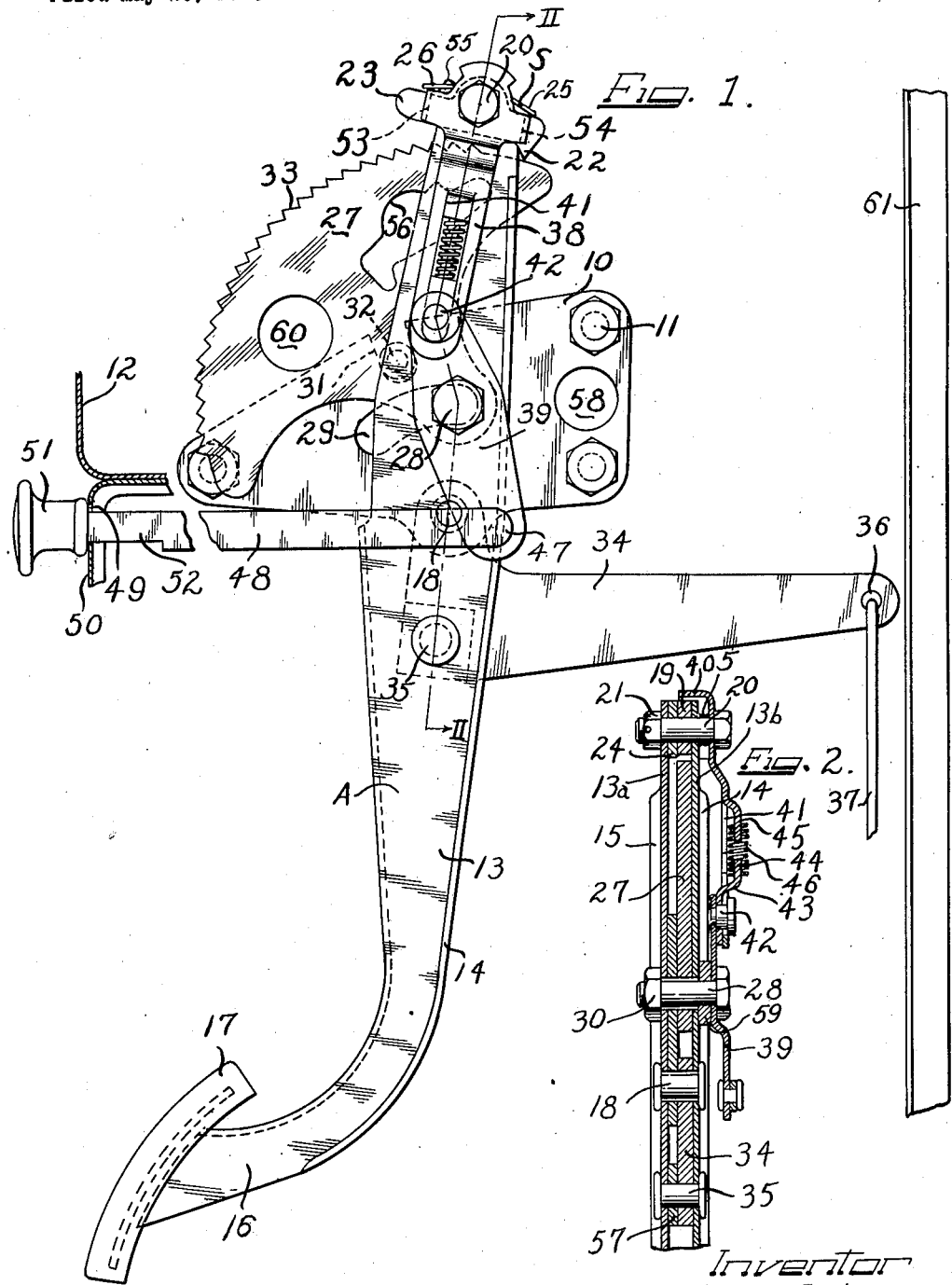
Inventor
HERBERT S. JANDUS

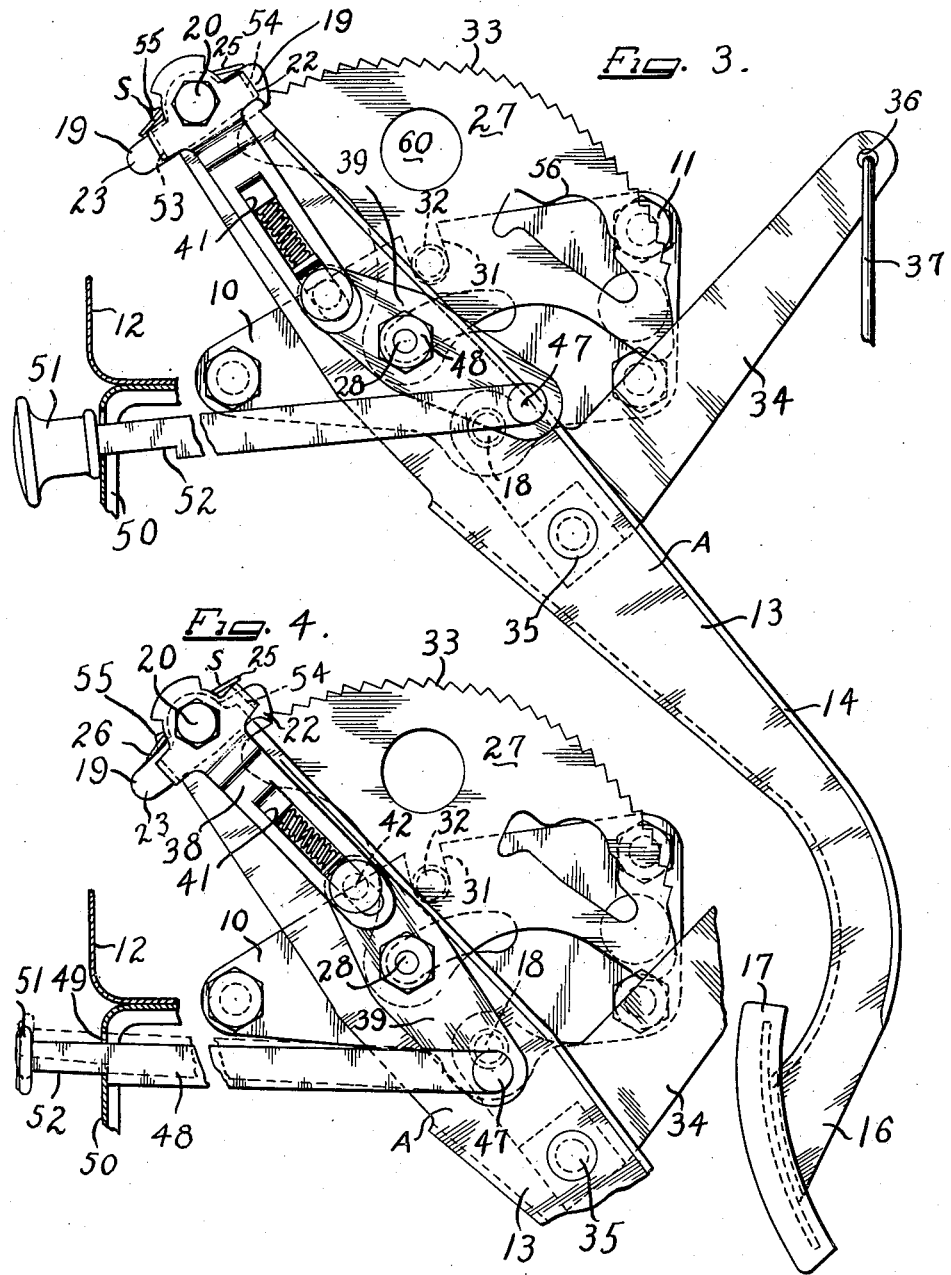

Patented Apr. 19, 1949

2,467,557

UNITED STATES PATENT OFFICE 2,467,557

BRAKE LEVER STRUCTURE

Herbert S. Jandus, Detroit, Mich., assignor to Houdaille-Hershey Corporation, Detroit, Mich., a corporation of Michigan Application May 20, 1946, Serial No. 671,083

8 Claims. (Cl. 74—535)

The present invention relates to a brake lever structure and more particularly to a novel release means for the structure.

The invention is herein illustrated and described as an underslung foot operated brake lever, however, it is to be understood that the lever may be arranged as a conventional foot pedal, which arrangement would involve a redistribution and rearrangement of parts without in any manner involving any difference in the manner of operation.

The structure of the present invention involves a lever pivoted between its ends to a suitable support having at one end a manipulator such as a foot pad and suitably disposed on a portion of the lever the other side of its pivot is a rockable pawl which is rocked by means of a loaded spring into and out of engagement with a ratchet or sector. The invention includes means for shifting the pressure or load of the pawl spring from one end of the pawl to the other.

An object of the present invention is to provide a novel brake lever structure of the pawl and ratchet type in which the pawl is rocked into and out of latched engagement with a ratchet or sector by means of a spring the ends of which engage opposite ends of the pawl.

Another object of the present invention is to provide, in a brake lever structure of the pawl and ratchet type, spring means for rocking the pawl, and toggle means for varying the pressure of the pawl spring with respect to the ends of the pawl.

A further object of the present invention is to provide a novel and simple release means for a brake lever structure which enables a progressive or multistage release such as to preclude accidental release of the brake.

A still further object of the present invention is to provide toggle means for releasing the clutch engaging members of a brake lever structure.

A still further object of the present invention is to provide, in a brake lever structure, toggle means for releasing the lever from brake setting position, and including manually operable means for setting up the toggle to cause the pawl to snap to released position when tooth pressure between the pawl and its ratchet or sector is relieved.

Generally speaking, the brake lever structure of the present invention contemplates a pawl rockably supported on a brake lever and spring means engaging opposite ends of the pawl. For effecting pressure of an end of the pawl spring against the end of the pawl, toggle means are provided for relieving the pressure of the spring against one end of the pawl and increasing the pressure of the spring against the other end of the pawl.

The above, other and further objects of the present invention will be apparent from the following description and accompanying drawings.

An embodiment of the present invention is illustrated in the accompanying drawings, and the views thereof are as follows:

Figure 1 is a side elevational view of the brake lever structure of the present invention showing the position and relationship of the parts when the lever is in fully released position.

Figure 2 is a sectional view taken in the plane of line II—II of Figure 1.

Figure 3 is a side elevational view of the brake lever structure showing the lever moved to its limit of extent in brake setting direction, and with the toggle means disposed to stress spring pressure on the nose end of the pawl.

Figure 4 is a view similar to Figure 3 showing the toggle moved over center to stress spring pressure against the tail end of the pawl.

The brake lever structure of the present invention is herein illustrated as an underslung foot pedal and as so illustrated includes a plate 10 secured by bolts 11 to the vehicle structure behind the instrument panel 12.

The lever body 13 is formed as a stamping U-shape in cross-section with margins of the side portions outwardly flanged at 14 and 15 for the purposes of rigidity. The lower end of the body 13 is curved at 16 and is provided with a foot pad or plate 17. The lever body is pivoted to the plate 10 at 18, at a point intermediate the ends of the body. The side walls of the lever body are laterally spaced as is common practice in the manufacture of a stamped lever body.

For convenience, the side walls of the body are indicated at 13a and 13b (Figure 2). At the upper end of the body 13 an elongated pawl 19 is pivoted on a bolt 20, which bolt is held in place by a nut 21. One end of the pawl is provided with a pointed nose 22 for engagement with the ratchet or sector teeth and the other end of the pawl 23 is designated as the tail of the pawl. One surface of the pawl works against the inside surface of the wall 13b of the lever body, while between the other surface of the pawl and wall of the lever body 13a is interposed a washer 24.

Any suitable spring means may be employed. I have herein shown a spring S arranged with its intermediate portion coiled about the pivot 20 and one end 25 disposed to bear against the nose end of the pawl and its other end 26 disposed to bear against the tail end of the pawl, as may be seen in Figures 1, 3 and 4.

For engagement by the pawl 19 to latch the lever in selected position, a floating sector 27 is provided. The sector is disposed between the spaced legs of the body member 13 above its pivot 18. The sector is pivoted to the lever member A by a pivot bolt 28 which extends through suitable apertures in the side walls of the lever body and also through an arcuate slot 29 in the plate 10. A nut 30 on the bolt 28 holds the parts together.

The plate 10 is notched at 31 to receive a pin 32 fastened to the sector 27. Thus, as the lever is swung about its pivot 18, the sector will be swung about the pin 32 as a center and its teeth 33 moved underneath the nose 22 of the pawl.

Projecting from between walls 13a and 13b is a crank 34 apertured to receive the pivot pin 18 and attached to the lever body 13 below the pivot pin 18 by a rivet 35 whereby the crank is fixedly secured to the lever body. The outer end of the crank is provided with an aperture 36 to receive a connection 37 with the brake rigging of the vehicle.

For rocking the pawl 19 a toggle mechanism is provided.

The toggle mechanism illustrated includes an upper arm 38 and a lower arm 39. The upper arm 38 is swingable on the pawl pivot 20 and its upper end is formed with a bent-over portion 40 overlying the pawl. In side elevation, this bent-over portion is arcuate as will be observed in Figure 1. The arm 38 is slotted at 41 for a portion of its length.

The lower toggle arm 39 is pivoted on the bolt 28 intermediate the length of the arm.

Referring to Figures 1 and 2, a pin 42 is fastened to the upper end of the lower arm 39 and extends through the slot 41 in the upper arm 38. Mounted on the pin 42, between the arm 39 and the arm 38, is a finger member 43 which is bent to extend outwardly through the slot 41 in the arm 38 and with its end extending upwardly as at 44, as a finger. A portion of the upper arm 38 struck out from the slot 41 extends downwardly as at 45 as a finger, in alignment with the bent end or finger 44 of the piece 43. The adjacent ends of the parts 44 and 45 are spaced and surrounding them is a spring 46 whose function is to force the pin 42 to one side or the other of a line through the pivots 20 and 28 to prevent the arms 38 and 39 from remaining stationary at any intermediate point.

Pivoted at 47 to the lower end of lower arm 39 is a rod 48 which extends forwardly through an opening 49 in a flange 50 depending from the lower portion of the instrument panel 12. A knob or handle 51 is secured to the outer end of the rod 48. Immediately inwardly of the knob 51, the bar or rod 48 is notched at 52, the notch limiting the extent of normal outward movement of the rod 48 when pull is imposed on the knob 51. Referring to Figure 1, the toggle, the rod 48 and knob 51 are shown in normal or running position with the brakes off.

The upper end of the upper toggle arm 38 is provided with lateral lugs 53 and 54, the lug 53 underlying the end 26 of spring S and the lug 54 underlying the end 25 of the spring S.

Referring to Figure 1, with the brake in off position and the parts occupying the positions illustrated, the lug 53 of the toggle raises the end 26 of the spring S from the tail of the pawl thus increasing pressure of the end 25 of the spring against the nose end of the pawl to force the nose against the ratchet or sector to prevent rattling, and to insure engagement of the nose with a tooth of the ratchet when the lever is pulled to set the brakes.

It will be observed that the pivotal connection of the rod 48 with the lower toggle arm 39 is closely adjacent the pivotal connection 18 of the lever body to the plate 10 so that swinging of the lever body on its pivot would have little, if any, effect in imparting endwise movement to the rod 48.

Figure 3 illustrates the arrangement of the parts when the lever has been moved to its maximum extent in brake setting position and shows the pivotal connection 47 between the rod 48 and the lower toggle member 39 as being slightly above its position, shown in Figure 1, when the lever is in "off" position. It will be noted from Figure 3 that the rod 48 is slightly tilted.

Figure 3 shows the manner in which the end 26 of the spring S is raised from the tail 23 of the pawl by the lug 53 of the upper toggle member 38.

As before stated, lifting the end 26 of the spring S from the pawl increases the push pressure of the end 25 of the spring against the nose end 22 of the pawl, thus assuring positive engagement of the pawl nose 22 with a tooth of the ratchet or sector 27.

Figure 4 illustrates the arrangement of parts with the brakes set and with the release movement of the toggle initiated by pulling out the rod 48 to its limit as governed by its notch 52, which movement swings the toggle to the other position with its pivot or axis pin 42 on the other side of the center line through the pivots 20 and 28. This movement of the toggle causes the lug 54 of the upper toggle member 38 to raise the end 25 of the spring S from the nose end of the pawl, thus increasing the pressure of the end 26 of the spring against the tail end of the pawl. Thus, full effect of the spring S is applied to the tail end of the pawl acting in a direction to disengage its nose from a tooth of the sector.

Operation of the lugs 53 and 54, in the manner, loads the springs S to apply increased pressure, alternately, to its ends, for the purpose of actuating the pawl with respect to the sector.

With the parts as shown in Figure 4, that is, with the rod 48 pulled out to its limit as controlled by the length of the slot 52, the spring S is loaded to disengage the pawl from the sector. However, it will sometimes happen that the friction between the nose of the pawl and the engaged sector tooth will be such as to prevent the spring S from disengaging the pawl nose from the sector. Under such circumstances, the brake lever may be given a very slight movement in the direction of brake application which will relieve the pressure between the pawl nose and the sector sufficiently to enable the spring S to kick the nose out of engagement with the sector and thus allow release of the brakes and the return of the lever to its "off" position, which is that shown in Figure 1.

With the arrangement of the present invention, it is possible to release the brakes without imparting any movement to the brake lever to disengage the ratchet from the sector.

This disengagement is accomplished by lifting the knob end of the bar 48 in the opening 49 of the bracket or flange 50 and pulling the rod farther to the left from its position as viewed in Figure 4. This movement of the rod to the left, will actuate the toggle arms in such manner that the bent end 40 of the arm 38 will engage an upstanding lug 55 on the pawl 19 adjacent the tail end of the pawl and rock the pawl sufficiently to withdraw its nose from engagement with a tooth of the sector thereupon releasing the brakes.

The length of the slot 41 in the toggle member 38 and the position of the pivot pin 42 in the slot is such as to make this additional angular movement of the toggle arms possible.

For reducing the weight of the sector 27 and also for economy in manufacture, the pawl 19 is stamped out of the sector blank, as may be observed by the shape of the aperture 56 in the sector. In like manner the washer 57 which is interposed between the crank 34 and the walls 13a of the lever body is stamped from the plate in the area designated by the aperture 58. The washer 59 which is interposed between the lower arm 39 of the toggle and the side member 13b of the lever is stamped from the sector blank leaving the aperture 60 in the sector.

It will be observed that the spring means S on the opposite ends of the pawl 19 tends to urge these ends in counter-angular direction with respect to the pawl pivot 20.

The reference numeral 61 designates the wall or bulkhead between the engine and the driver's compartment of the vehicle.

It will, of course, be understood that various details of construction may be varied through a wide range without departing from the principles of this invention and it is, therefore, not the purpose to limit the patent granted hereon otherwise than necessitated by the scope of appended claims.

I claim as my invention:

1. A brake lever structure of the pawl and sector type, a pivoted pawl having a nose end and a tail end, spring means acting against said pawl ends tending to urge them in counterangular direction with respect to the pawl pivot, an arm pivoted to said lever and having parts engageable with said spring means adjacent the pawl ends, a second arm pivoted to said lever and operatively connected to said first arm and operable when swung in one direction for actuating said first arm to relieve spring pressure against one end of the pawl and stressing spring pressure against the other end of the pawl, and means for actuating said second arm.

2. In a brake lever structure of the pawl and sector type, a pivoted pawl having a nose end and a tail end, spring means acting against said pawl ends tending to urge them in counterangular direction with respect to the pawl pivot, an arm pivoted to said lever and having parts engageable with said spring means adjacent the pawl ends, a second arm pivoted to said lever and operatively connected to said first arm and operable when swung in one direction for actuating said first arm and relieving spring pressure against the tail end of the pawl and stressing spring pressure against the nose end of the pawl to effect latching engagement of the pawl with the sector, and manually operable means for actuating said second arm.

3. In a brake lever structure of the pawl and sector type, a pivoted pawl having a nose end and a tail end, spring means acting against said pawl ends tending to urge them in counter-angular direction in respect to the pawl pivot, an arm pivoted to said lever and having parts engageable with said spring means adjacent the pawl ends, a second arm pivoted to said lever and operatively connected to said first arm and operable when swung in one direction for actuating said first arm and relieving spring pressure against the nose end of the pawl and stressing spring pressure against the tail end of the pawl to urge said pawl in unlatching direction, and manually operable means for actuating said second arm.

4. In a brake lever structure of the pawl and sector type, a pivoted pawl having a nose end and a tail end, a spring having its intermediate portion coiled about the pawl pivot and having its ends in contact with said pawl ends and tending to urge them in counter-angular direction with respect to the pawl pivot, toggle means on the lever for relieving spring pressure against one end of the pawl and stressing spring pressure against the other end of the pawl to tilt the pawl on its pivot, one of the members constituting said toggle means having projections underlying the ends of the pawl spring to lift one spring end from its adjacent pawl end to stress spring action against the other pawl end as said one member is swung in one direction and to lift the other spring end from its pawl end to stress spring action against the opposite pawl end when said one member is swung in the opposite direction, and manually operable means for actuating said toggle means.

5. In a brake lever structure of the pawl and sector type, a pivoted pawl having a nose end and a tail end, a spring having its intermediate portion coiled about the pawl pivot and having its ends acting against the pawl ends and tending to urge them in counter-angular direction with respect to the pawl pivot, toggle means for relieving spring pressure against the nose end of the pawl and stressing spring pressure against the tail end of the pawl to disengage the pawl from the sector with snap action when pressure between the pawl and sector is relieved, one of the members constituting said toggle means having projections underlying the ends of the spring to lift the spring end from the nose end of the pawl and stress spring pressure against the tail end of the pawl as said member is swung in one direction, and means for actuating said toggle means.

6. In a brake lever structure of the pawl and sector type, a pivoted pawl having a nose end and a tail end, a pawl spring having its intermediate portion coiled about the pawl pivot and having its ends overlying the ends of the pawl, toggle means operative to relieve the pressure of a spring end against one of said pawl ends and increase spring pressure of the other end of said spring against the other end of said pawl, and manually operable means for actuating said toggle means.

7. In a brake lever structure of the pawl and sector type, snap-over means on the lever for rocking the pawl, said snap-over means including an arm pivoted to the lever on the pawl pivot, a second arm pivoted to said lever on a pivot remote from the pawl pivot, the adjacent ends of said arms being pivoted together as a toggle, a spring cooperating with said arms to effect over-center action when one of said arms is rocked, and a manually operable member connected to said second arm and operable in one direction to rock said second arm in such manner as to cause said snap-over means to rock the pawl in sector-engaging direction and operable in the opposite direction to cause said snap-over means to rock the pawl in sector-releasing direction.

8. In a brake lever structure of the pawl and sector type, a pivoted pawl having a nose end and a tail end, spring means acting against said pawl ends tending to urge them in counter-angular direction with respect to the pawl pivot, toggle means on the lever for relieving spring pressure against the nose end of the pawl and stressing spring pressure against the tail end of the pawl tending to urge the pawl in unlatching direction, manually operable means having a normal movement of limited extent to actuate said toggle means to stress spring pressure against the pawl tail and capable of abnormal movement of greater extent to press a part of a toggle arm against the pawl tail with force sufficient to disengage the pawl from the sector without easement of pressure between pawl and sector.

HERBERT S. JANDUS.

REFERENCES CITED

The following references are of record in the file of this patent:

UNITED STATES PATENTS

| Number | Name | Date |
|---|---|---|
| 1,509,632 | Bracci | Sept. 23, 1924 |
| 1,711,929 | Druhe | May 7, 1929 |
| 2,377,690 | Jandus | June 5, 1945 |

FOREIGN PATENTS

| Number | Country | Date |
|---|---|---|
| 406,047 | Great Britain | Feb. 22, 1934 |